United States Patent [19]
Cooper et al.

[11] Patent Number: 5,993,124
[45] Date of Patent: Nov. 30, 1999

[54] ROUTER DUST-COLLECTION SYSTEM

[75] Inventors: Randy G. Cooper, Milan; Michael K. Taylor, Alamo, both of Tenn.

[73] Assignee: Porter-Cable Corporation, Jackson, Tenn.

[21] Appl. No.: 08/891,465

[22] Filed: Jul. 10, 1997

[51] Int. Cl.$^6$ .............................. B23C 1/20; B27G 21/00; B23B 47/34

[52] U.S. Cl. ...................... 409/137; 144/252.1; 409/182; 451/456

[58] Field of Search ..................................... 409/137, 182, 409/185; 144/252.1, 251.1, 251.2; 408/67; 451/451, 456

[56] References Cited

U.S. PATENT DOCUMENTS

| | | |
|---|---|---|
| 4,051,880 | 10/1977 | Hestily . |
| 4,088,164 | 5/1978 | McCord, Jr. .......................... 144/252.1 |
| 4,108,225 | 8/1978 | Hestily . |
| 4,395,167 | 7/1983 | Maternus . |
| 4,409,699 | 10/1983 | Moorhouse .......................... 409/137 X |
| 4,613,261 | 9/1986 | Maier et al. ............................ 409/137 |
| 4,738,571 | 4/1988 | Olson et al. . |
| 4,742,855 | 5/1988 | Hartley . |
| 4,750,536 | 6/1988 | Grisley ................................. 144/252.1 |
| 4,821,365 | 4/1989 | Charters . |
| 5,031,678 | 7/1991 | Remmele et al. .................. 409/137 X |
| 5,311,914 | 5/1994 | Stornetta . |
| 5,370,165 | 12/1994 | Stornetta . |
| 5,456,559 | 10/1995 | Taylor . |
| 5,503,203 | 4/1996 | Stornetta . |
| 5,509,454 | 4/1996 | Giacometti ........................... 144/252.1 |
| 5,551,813 | 9/1996 | Bonnett . |
| 5,584,620 | 12/1996 | Blickhan et al. ....................... 409/137 |

OTHER PUBLICATIONS

Spielman, P., "Router Jigs & Techniques", Sterling Publishing Co., Inc., Front cover, Copyright page and pp. 74–76 (1988).

"Model 5020 Routo–Vac Dust Collector Attachment", Porter–Cable Router & Trimmer Accessories, pp. 82 (Publicly available prior to the filing date of this application).

"Porter–Cable Dust Collector Attachment: 5020", Porter–Cable Professional Power Tools, 5 pages (Publicly available prior to the filing date of this application).

Primary Examiner—William Briggs
Attorney, Agent, or Firm—Merchant & Gould P.C.

[57] ABSTRACT

The present disclosure relates to a dust-collection system for use with a power tool such as a router. The system includes a router sub-base adapted for connection to a router. The router sub-base defines an opening configured to receive a cutting tool of the router. The system also includes lower and upper vacuum flowpaths. The lower vacuum flowpath is arranged and configured to evacuate dust from beneath the opening of the router sub-base. The upper vacuum flowpath is arranged and configured to evacuate dust from within the opening of the router sub-base.

15 Claims, 7 Drawing Sheets

ROUTER DUST-COLLECTION SYSTEM

FIELD OF THE INVENTION

The present invention relates generally to dust-collection systems. More particularly, the present invention relates to dust-collection systems for use with power tools such as routers.

BACKGROUND OF THE INVENTION

A router is a versatile power tool adapted to perform a variety of functions such as making grooves in wood, trimming or shaping edges, and making joints. A typical router includes an electric motor contained within a motor housing. The electric motor is operatively coupled to a collet configured for selectively retaining one of a plurality of cutting blades or bits. The router also includes a sub-base which is connected to the housing. The sub-base can be adjusted relative to the motor housing such that a bit retained in the collet can be set to project a desired distance through the sub-base. By activating the motor with the bit projecting through the sub-base, the router is adapted to perform routing functions on a work piece. The depth of cut provided by the router can be varied by altering the distance the cutting bit projects through the router sub-base.

A problem with conventional routers is that such routers typically generate a large amount of wood dust. What is needed is an effective dust-collection system for capturing or extracting dust generated by a router. What is also needed is a dust-collection system that can be easily used with existing routers.

SUMMARY OF THE INVENTION

One aspect of the present invention relates generally to a dust-collection system for use with a router. The dust-collection system includes a router sub-base adapted for connection to the router. The router sub-base defines an opening configured to provide clearance for a cutting tool of the router. The dust-collection system also includes a lower vacuum flowpath arranged and configured to evacuated dust from beneath the opening of the router sub-base. The dust-collection system further includes an upper vacuum flowpath positioned above the lower vacuum flowpath. The upper vacuum flowpath is arranged and configured to evacuate dust from within the opening defined by the router sub-base.

Another aspect of the present invention relates to a dust-collection system including a router sub-base that defines an evacuation channel configured for evacuating dust from the region proximate a collet opening defined by the sub-base. An upper evacuation conduit is in fluid communication with the evacuation channel. A top cover forms a partially enclosed upper vacuum chamber that is located above the collet opening of the router sub-base. Additionally, a bottom cover forms a partially enclosed lower vacuum chamber located below the collet opening of the router sub-base. A lower evacuation conduit is in fluid communication with the lower vacuum chamber. The upper and lower evacuation conduits are adapted for connection to one or more vacuum sources.

The various aspects of the present invention provide a wood dust-collection system capable of capturing a large percentage of the dust generated by a router. Consequently, the present invention helps to reduce clean-up times and generate a more healthy work environment. Additionally, the present invention is designed to accommodate the various functions for which a router is typically used. For example, the present invention provides upper and lower vacuum systems that are particularly effective for collecting dust generated by routing functions performed along the edge of a work piece such as decorative edging and rabbiting. Additionally, for routing applications that are performed completely over a work piece, such as cutting a groove or dado, the bottom vacuum system can be removed such that dust evacuation is performed solely by the upper vacuum system. Such versatility is particularly suited for power tools such as routers, which have a variety of diverse uses. The present invention also provides a dust-collection system that can easily be used with existing router designs.

A variety of additional advantages of the invention will be set forth in part in the description which follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Figure 1:
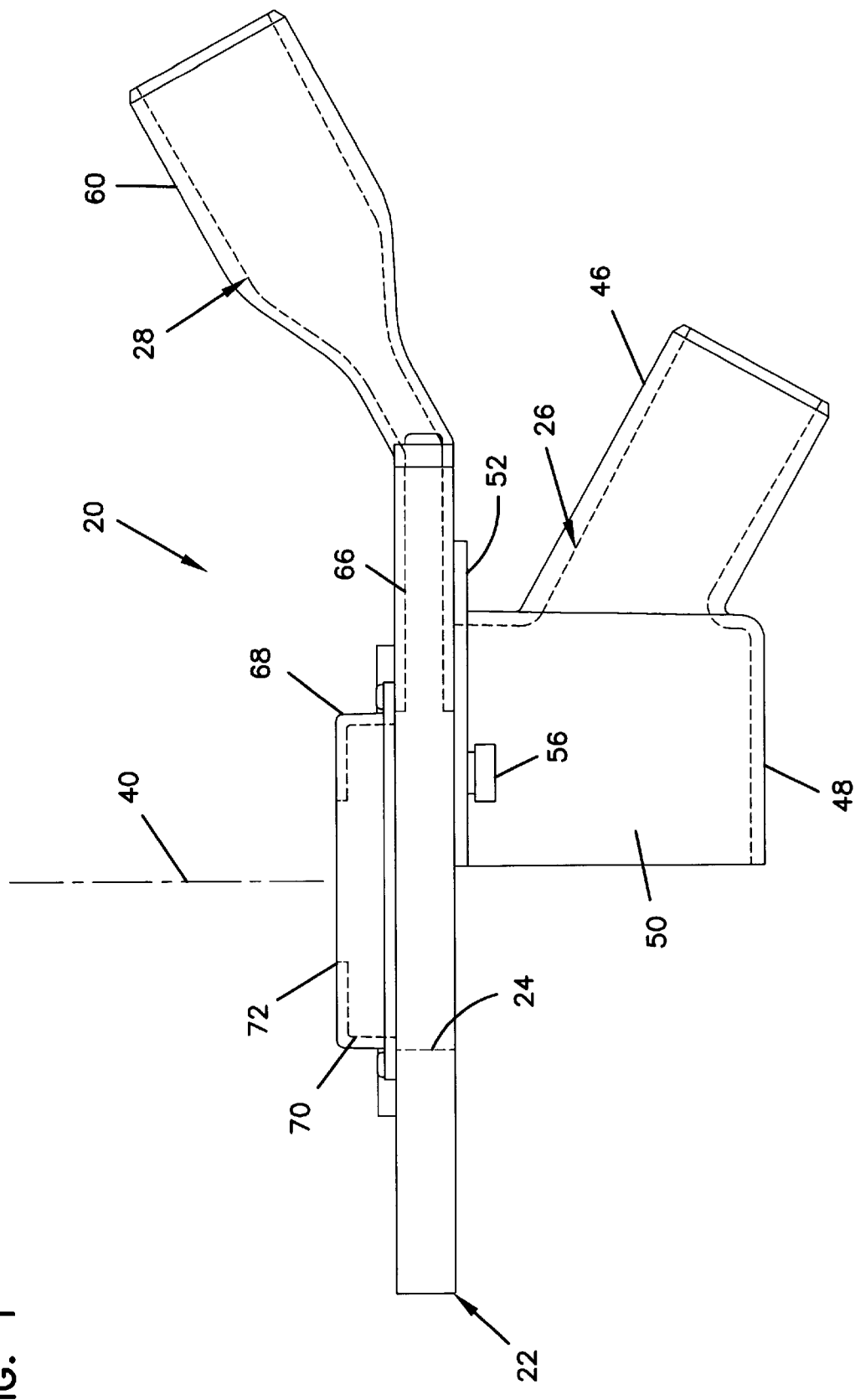
FIG. 1 is a side view of a router dust-collection system constructed in accordance with the principles of the present invention.
Figure 2:
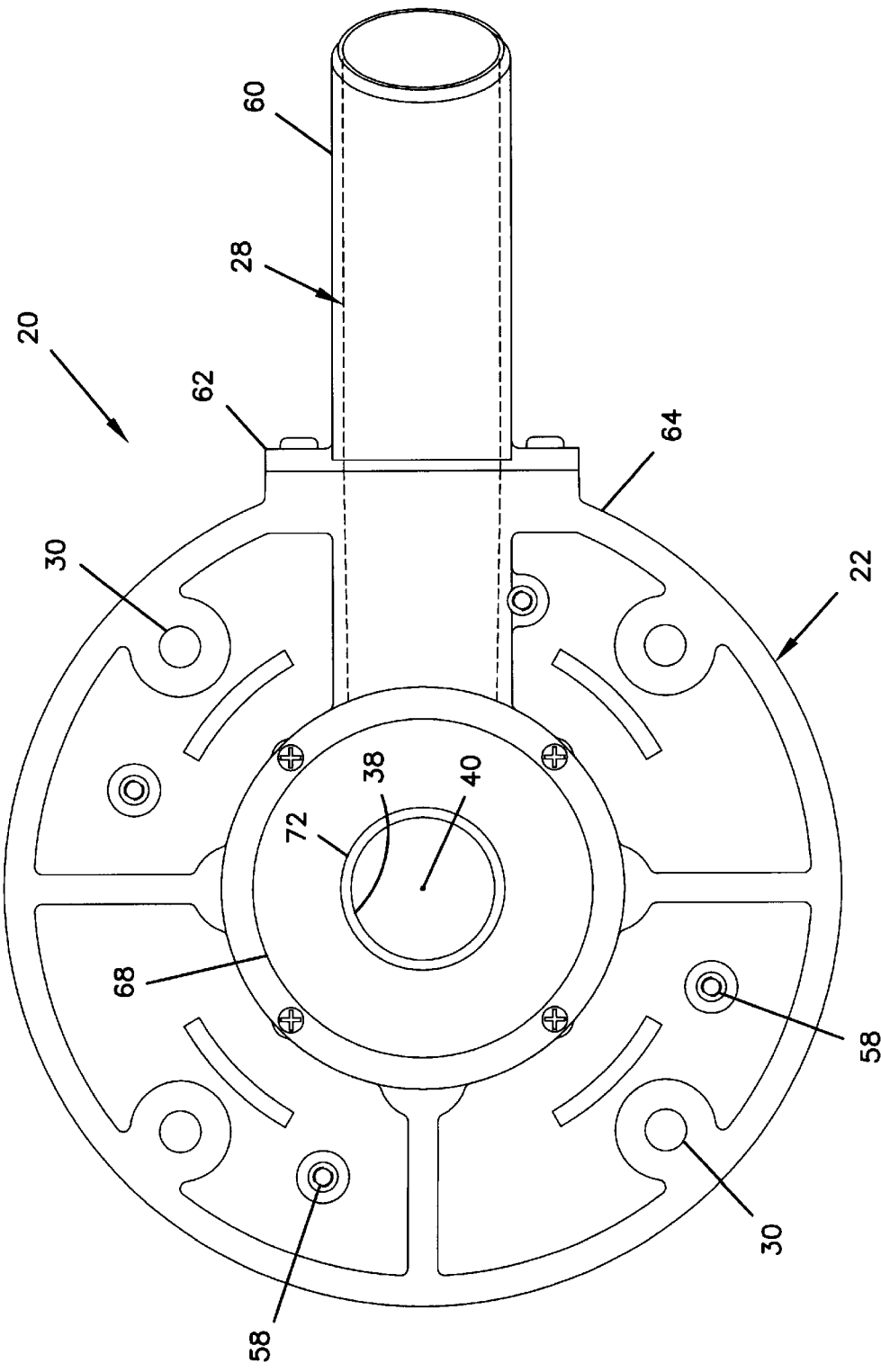
FIG. 2 is a top view of the dust-collection system of FIG. 1.

Reference will now be made in detail to exemplary aspects of the present invention which are illustrated in the accompanying drawings. Wherever possible, the same reference numbers will be used throughout the drawings to refer to the same or like parts.

FIGS. 1–4 illustrate an exemplary router dust-collection system 20 constructed in accordance with the principles of the present invention. Generally, the dust-collection system 20 includes an exemplary router sub-base 22 adapted for connection to a router. Alternately, the sub-base 22 could be integrated into a router or a router base system. The router sub-base defines central collet opening 24 configured to receive a collet and cutting bit of the router. The dust-collection system 20 also includes a lower vacuum flowpath 26 and an upper vacuum flowpath 28. The lower vacuum flowpath 26 is arranged and configured to evacuate dust from beneath the opening 24 of the router sub-base 22. The upper vacuum flowpath 28 is arranged and configured to evacuate dust from within the opening 24 of the router sub-base 22.

The exemplary router sub-base 22 of the dust-collection system 20 has a generally circular shape and has a size that typically corresponds with the size of router to which the sub-base 22 will be attached. Alternately, the router sub-base can be of other shapes familiar to those skilled in the art. For example, the sub-base may be configured with one or more linear edges or with offset portions for providing stability during routing operations.

The exemplary router sub-base 22 defines a plurality of bolt openings 30 configured to allow the sub-base 22 to be bolted to the base of a router. Of course, a variety of other conventionally known techniques could also be used to fasten the sub-base 22 to a router. As indicated previously, the sub-base can also be integrally formed to a router or a router base.

Figure 3:
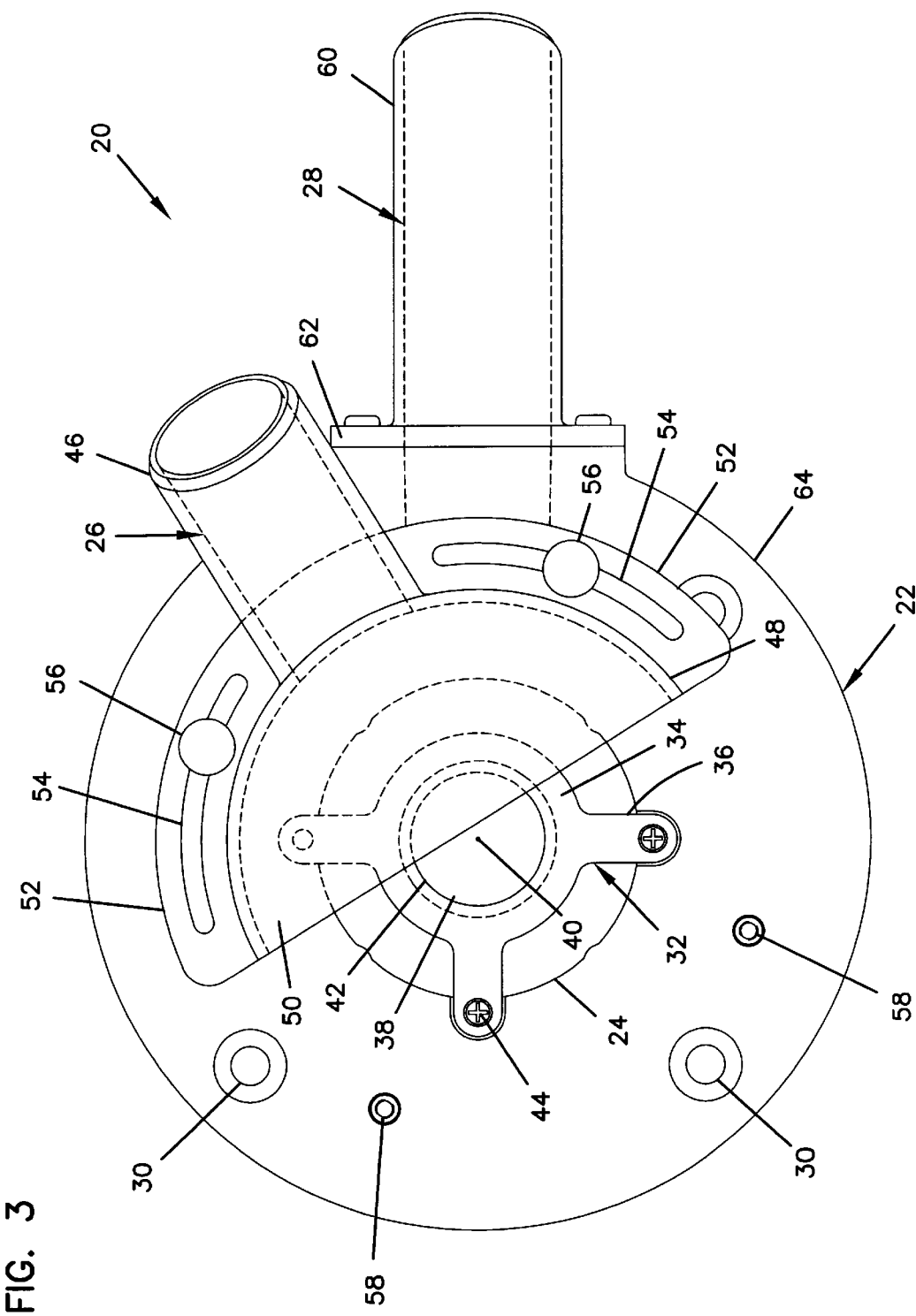
FIG. 3 is a bottom view of the dust-collection system of FIG. 1 with the bottom vacuum conduit pivoted to more clearly illustrate the top vacuum conduit.
Figure 4:
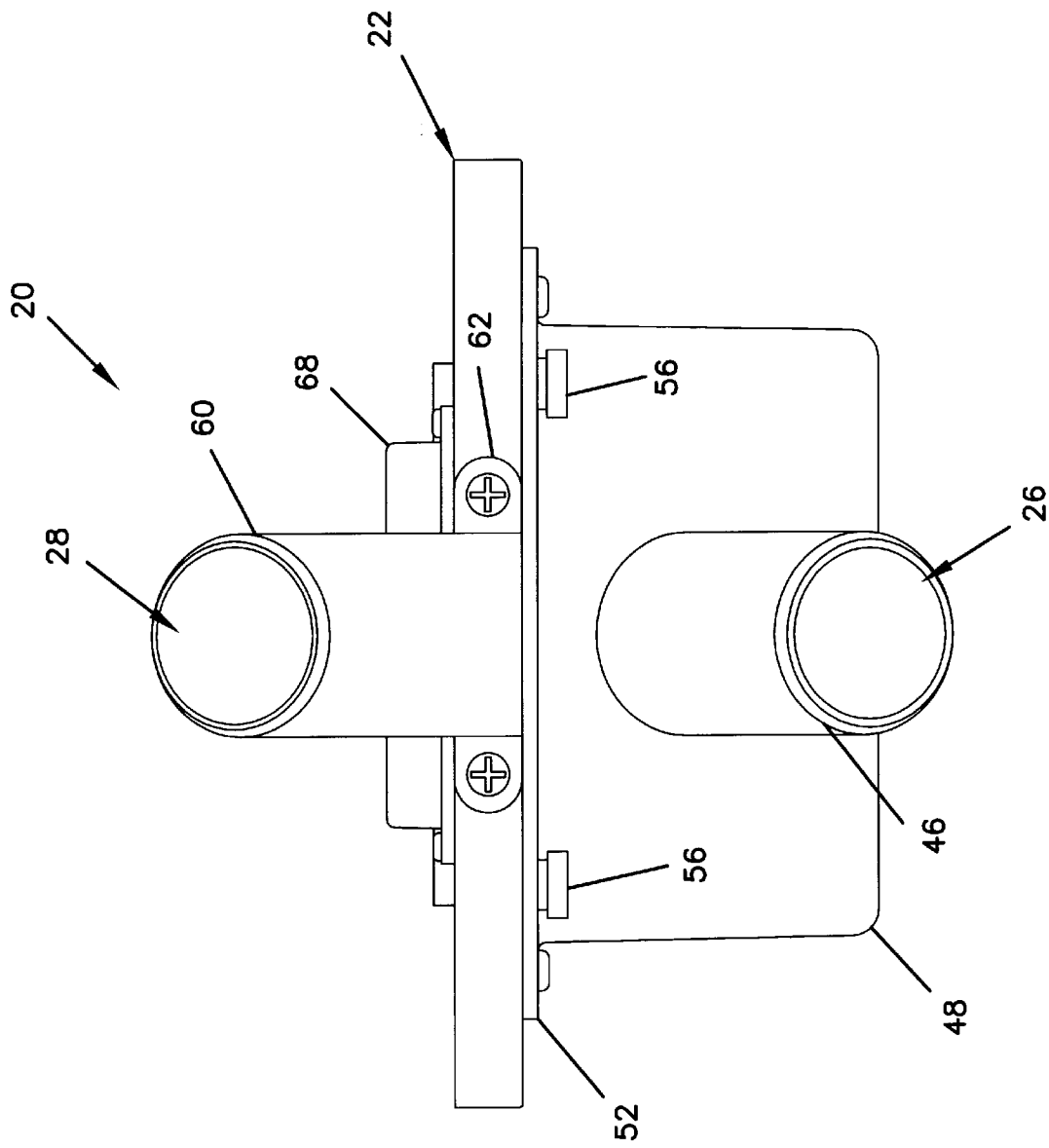
FIG. 4 is a rear view of the router dust-collection system of FIG. 1.

In FIG. 3, an exemplary template guide holder 32 is shown mounted on the bottom of the router sub-base 22. The template guide holder 32 includes an annular portion 34 and three circumferentially spaced arms 36 that project radially outward from the annular portion 34. The annular portion 34 defines a central aperture 38 that is centered on a central axis 40 passing transversely through the router sub-base 22. The central aperture 38 is sized to receive a template guide and the upper surface of the annular portion 34 defines an annular shoulder 42 (shown in hidden line) configured to seat a conventional retaining nut used to secure the template guide to the template guide holder 32. The arms 36 of the template guide holder 32 have ends that are inset within semicircular recesses defined by the bottom surface of the router sub-base 22. Screws 44 or other means are used to detachably connect the template guide holder 32 to the router sub-base 22. Also, the holder 32 can be integral with the sub-base 22.

The lower vacuum flowpath 26 of the dust-collection system 20 is partially formed by a lower evacuation conduit 46 adapted for connection to a source of vacuum. The lower evacuation conduit 46 is integrally formed with a bottom cover 48 that partially covers the collet opening 24 and that defines a partially enclosed lower vacuum chamber 50 that is in fluid communication with the lower evacuation conduit 46. The bottom cover 48 includes a radial flange 52 that abuts the bottom surface of the router sub-base 22. Arcuate slots 54 are defined within the annular flanges 52. The bottom cover 48 is connected to the bottom of the sub-base 22 by set screws 56 that pass through the arcuate slots 54 and are threaded within tapped holes 58 formed in the sub-base 22. By loosening the set screws 56, the bottom cover 48 can be pivoted about the central axis 40 to adjust the orientation of the lower evacuation conduit 46. The sub-base 22 includes four separate tapped holes 58. By selecting the appropriate holes 58, the bottom cover 48 can be pivoted 360° about the central axis 40.

The upper vacuum flowpath 28 of the dust-collection system 20 is partially formed by an upper evacuation conduit 60 adapted for connection to a source of vacuum. The upper evacuation conduit 60 has a flange 62 that abuts and is fastened by means such as screws to a periphery 64 of the router sub-base 22. The upper evacuation conduit 60 projects radially outward from the periphery 64 of the sub-base 22 and is in fluid communication with an evacuation channel 66 defined by the sub-base 22. The evacuation channel 66 extends radially from the central collet opening 24 of the sub-base 22 toward the sub-base periphery 64. Consequently, the evacuation channel 66 is arranged and configured for evacuating dust from within the central collet opening 24 of the sub-base 22.

As shown in the FIG. 1, the upper conduit 60 projects radially outward and upward from the sub-base 22. It will be appreciated that the upper conduit 60 can also be oriented to extend radially outward and downward from the sub-base 22. Additionally, the various components of the dust-collection system 20 can also be integrally formed as a single piece unit.

The dust-collection system 20 also includes a top cover 68 fastened to the top side of the router sub-base 22. The top cover 68 covers the central collet opening 24 of the sub-base 22 and defines a partially enclosed upper vacuum chamber 70 located above the opening 24. The top cover 68 also defines a cover opening 72 that is centered on the central axis 40.

Figure 5:
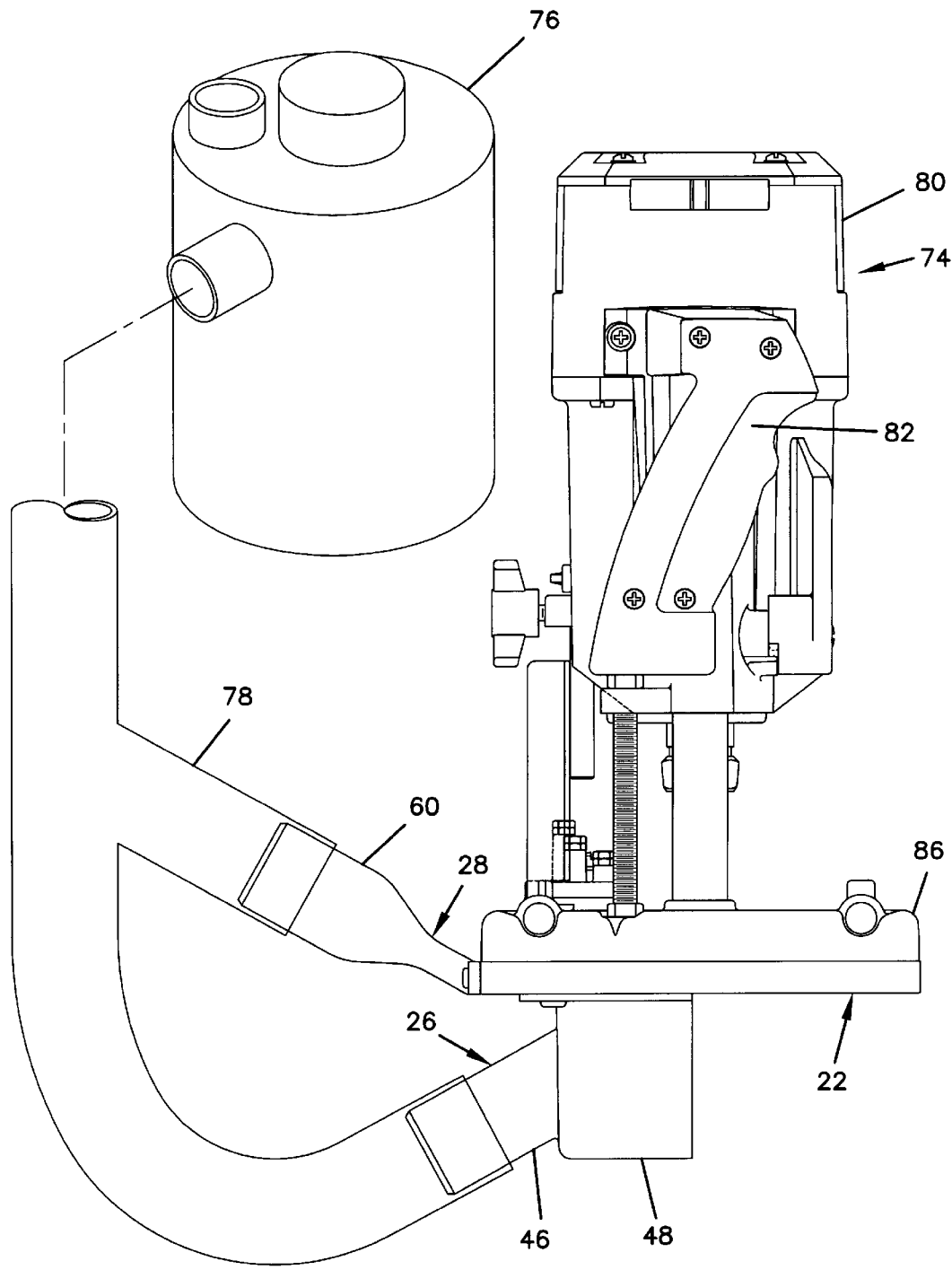
FIG. 5 shows the router dust-collection system of FIGS. 1–4 mounted on a router, vacuum hoses are shown connected to the dust-collection system.
Figure 6:
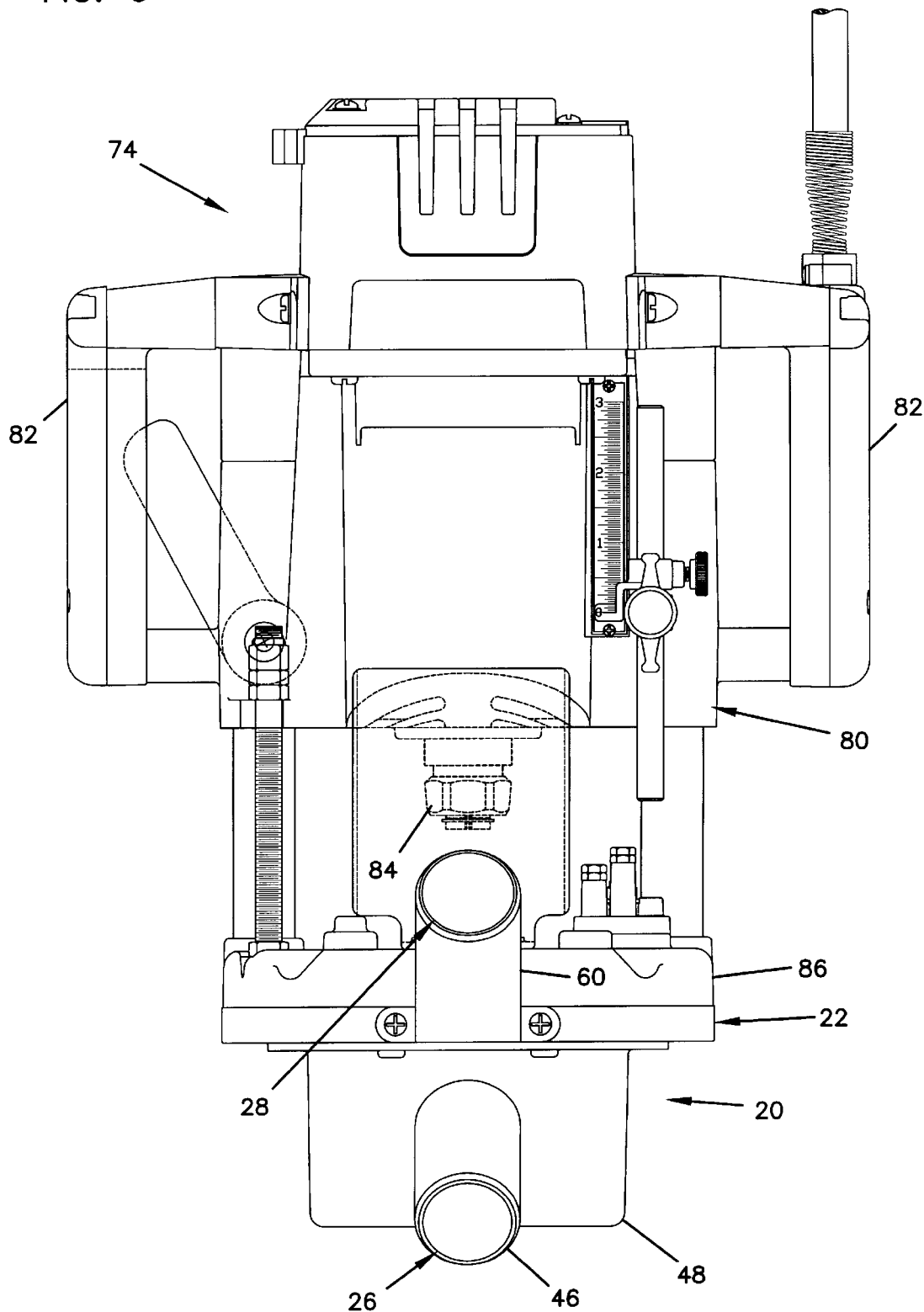
FIG. 6 is a front elevational view of the router of FIG. 5, the dust-collection system is shown with the vacuum hoses removed.
Figure 7:
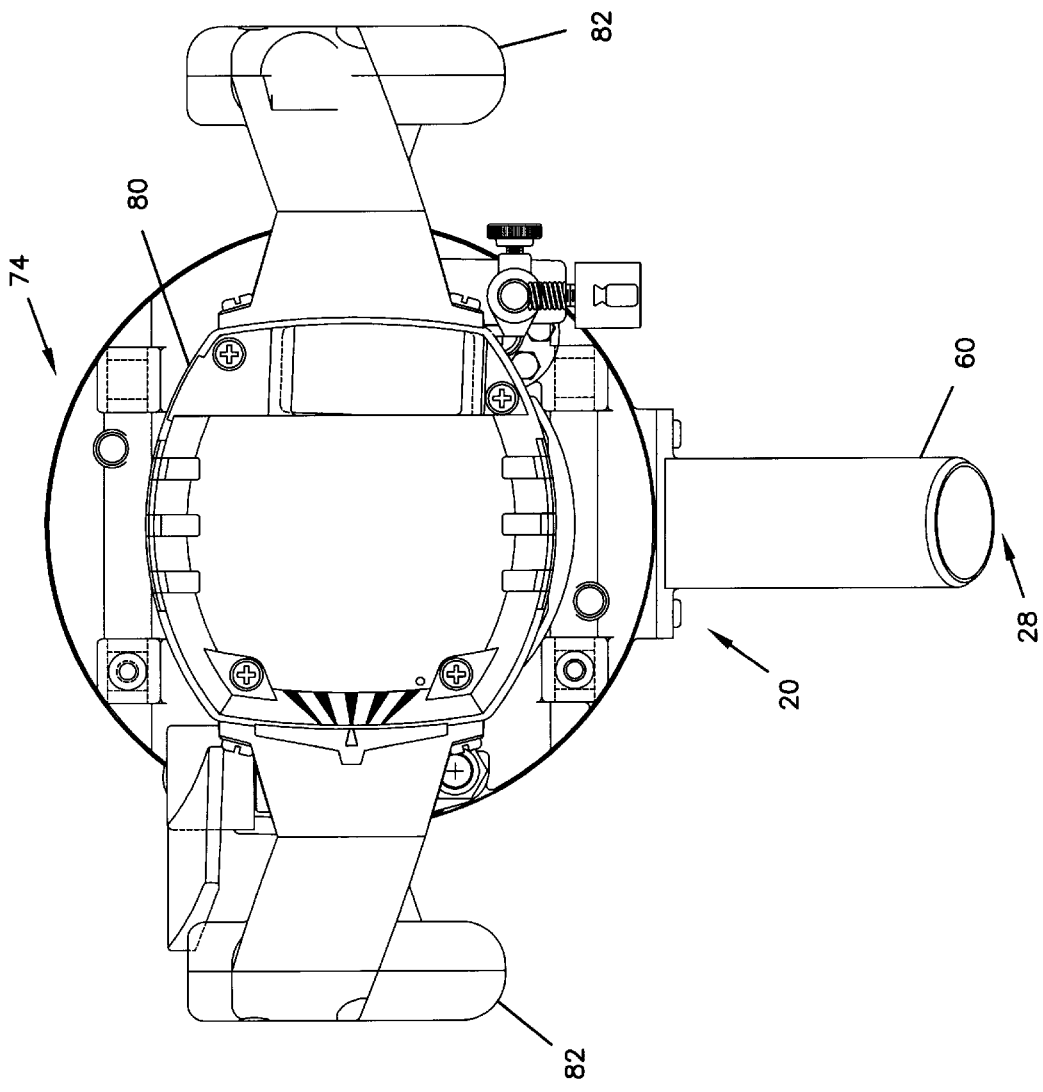
FIG. 7 is a top view of the router of FIG. 5, once again the vacuum hoses have been removed from the dust-collection system.

FIGS. 5–7 show the dust-collection system 20 mounted on a router 74. As shown in FIG. 5, the lower and upper vacuum flowpath 26 and 28 are connected to a single source of vacuum source 76 by a Y-connector 78. The Y-connector 78 may have a flexible or rigid configuration. For ease of illustration, the connector 78 is shown extending upward from the router 74. However, for most applications, the connector 78 will extend generally downward from the router 74 to minimize interference with an operator. It will be appreciated that the lower and upper vacuum flow paths 26 and 28 could also be connected to separate vacuum sources and could be independently operated.

As shown in FIGS. 5–7, the router 74 comprises a plunge router having a motor housing 80 equipped with handles 82. A collet 84 is operatively connected to a motor within the housing 80. The router 74 also includes a base 86 configured for connection to a sub-base.

Although the router 74 shown in FIGS. 5–7 comprises a plunge router, it will be appreciated that the dust-collection system 20 is adapted to be used with a variety of different types of routers. For example, the dust-collection system is adapted for use with the Porter Cable Model No. 100 ⅞ horsepower router, the Porter Cable Model No. 691 1½ horsepower D-handle router, the Porter Cable Model No. 693 1½ horsepower plunge router, the Porter Cable Model No. 7536 Speedmatic® 2½ horsepower router, the Porter Cable Model No. 7537 Speedmatic® 2½ horsepower D-handle router, the Porter Cable Model No. 7538 Speedmatic® 3½ horsepower plunge router, the Porter Cable Model No. 7539 Speedmatic® 3¼ horsepower 5-speed plunge router, the Porter Cable Model No. 7518 Speedmatic® 3¼ horsepower 5-speed router, and the Porter Cable Model No. 7519 Speedmatic® 3¼ horsepower router. Of course, the above-identified routers are strictly illustrative and dust-collection systems constructed in accordance with the principles of the present invention can be used in combination with any number of other routers as well as with routers mounted to fixtures or jigs such as router tables.

In use, the exemplary dust-collection system 20 is mounted on the router 74 by removing an existing sub-base of the router 74 and replacing the existing sub-base with the router sub-base 22. As mounted on the base 86 of the router 74, the collet opening 24 defined by the sub-base 22 is configured to receive the collet 84 of the router 74. One skilled in the art will recognize that the dust-collection system 20 can be oriented such that the lower and upper conduits 46 and 60 together or individually project outward from the front, back or sides of the router. The particular orientation of the conduits 46 and 60 depends upon the preference of the user and the routing function desired to be performed.

When performing routing functions, a bit secured within the collet 84 projects downward through the collet opening 24 defined by the router sub-base 22. For certain applications, the lower and upper vacuum flowpaths 26 and 28 can be used in combination to extract dust generated by the router 74. For example, the dual use of the lower and upper vacuum flow paths 26 and 28 is effective when forming decorative edges or rabbiting. For applications in which substantially the entire bottom surface of the router sub-base 22 is required to abut a work piece, such as forming grooves or dados, the bottom cover 48 can be removed from the sub-base 22 and the upper vacuum flowpath 28 can solely be used to evacuate dust generated by the router 74.

With regard to the foregoing description, it is to be understood that changes may be made in detail, especially in matters of the shape, size and arrangement of the parts without departing from the scope of the present invention. It is intended that the specification and depicted aspects be considered exemplary only, with a true scope and spirit of the invention being indicated by the broad meaning of the following claims.

What is claimed is:

1. A dust-collection system for use with a router, the dust-collection system comprising:
    a plate-like router sub-base adapted for connection to the router, the router sub-base including a top side adapted to face an underside of the router and a generally planar bottom side adapted to contact a workpiece during use of the router, the router sub-base also including an inner transverse wall that extends transversely between the top and bottom sides of the sub-base, the inner transverse wall defining a cutting tool opening configured to receive a cutting tool of the router; and
    the router sub-base defining an evacuation passageway that extends radially from the cutting tool opening to a periphery of the sub-base, the evacuation passageway including an open intake end positioned at the cutting tool opening, the open intake end being defined through the inner transverse wall of the sub-base, and the evacuation passageway also including an open discharge end that is defined through the periphery of the plate-like router sub-base and faces radially outward from the periphery of the plate-like router sub-base.

2. The dust-collection system of claim 1, further comprising a top cover at least partially covering the cutting tool opening of the router sub-base so as to define an upper vacuum chamber located above the cutting tool opening.

3. A dust-collection system for use with a router, the dust-collection system comprising:
    a router sub-base adapted for connection to the router, the router sub-base defining an opening configured to receive a cutting tool of the router;
    an evacuation channel defined by the router sub-base, the evacuation channel extending radially from the opening of the sub-base toward a periphery of the router sub-base;
    an upper evacuation conduit in fluid communication with the evacuation channel;
    a top cover forming a partially enclosed upper vacuum chamber located above the opening of the router sub-base;
    a bottom cover forming a partially enclosed lower vacuum chamber located below the opening of the router sub-base; and
    a lower evacuation conduit in fluid communication with the lower vacuum chamber.

4. The dust-collection system of claim 1, further comprising an evacuation conduit in fluid communication with the evacuation passageway, the evacuation conduit being connected to the periphery of the router sub-base and being adapted for connection to a source of vacuum.

5. The dust-collection system of claim 4, wherein the evacuation conduit projects radially outward from the periphery of the router sub-base.

6. The dust-collection system of claim 3, wherein the bottom cover can be pivoted relative to the router sub-base.

7. The dust-collection system of claim 1, wherein the router sub-base is connected to the router.

8. The dust-collection system of claim 1, further comprising a bottom cover at least partially covering the cutting tool opening in the router sub-base so as to define a lower vacuum chamber located below the sub-base.

9. The dust-collection system of claim 8, further comprising an evacuation conduit in fluid communication with the lower vacuum chamber and adapted for connection to a source of vacuum.

10. The dust-collection system of claim 9, wherein the bottom cover can be pivoted about a central axis passing transversely through the router sub-base to adjust the orientation of the evacuation conduit.

11. The dust-collection system of claim 10, wherein the bottom cover defines arcuate slots configured for allowing the bottom cover to be pivoted about the central axis.

12. The dust-collection system of claim 1, further comprising a template guide holder connected to the router sub-base.

13. The dust-collection system of claim 12, wherein the template guide holder is detachably connected to the router sub-base.

14. The dust-collection system of claim 12, wherein the template guide holder includes an annular portion adapted for receiving a template guide, and a plurality of legs extending radially from the annular portion.

15. The dust-collection system of claim 3, further comprising means for connecting the upper and lower evacuation conduits to a single source of vacuum.

* * * * *